United States Patent
Park et al.

(10) Patent No.: US 9,537,125 B2
(45) Date of Patent: Jan. 3, 2017

(54) BATTERY MODULE

(71) Applicant: SAMSUNG SDI CO., LTD., Yongin-si, Gyeonggi-do (KR)

(72) Inventors: Shi-Dong Park, Yongin-si (KR); Jong-Han Rhee, Yongin-si (KR); Tae-Yong Kim, Yongin-si (KR); Jun-Woo Cho, Yongin-si (KR); Seong-Joon Park, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 283 days.

(21) Appl. No.: 14/245,586

(22) Filed: Apr. 4, 2014

(65) Prior Publication Data
US 2015/0004469 A1 Jan. 1, 2015

Related U.S. Application Data

(60) Provisional application No. 61/839,965, filed on Jun. 27, 2013.

(51) Int. Cl.
*H01M 2/10* (2006.01)

(52) U.S. Cl.
CPC ............. *H01M 2/1077* (2013.01); *H01M 2/10* (2013.01); *H01M 2/1016* (2013.01); *H01M 2/1083* (2013.01); *H01M 2220/10* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,317,497 A | * | 3/1982 | Alt ..................... | H01M 2/1083 180/68.5 |
| 2008/0318119 A1 | * | 12/2008 | Watanabe ........... | B60L 11/1874 429/99 |
| 2009/0297892 A1 | * | 12/2009 | Ijaz ..................... | B23K 26/242 429/7 |
| 2011/0117409 A1 | | 5/2011 | Lee et al. | |
| 2011/0151299 A1 | * | 6/2011 | Park .................... | H01M 2/1077 429/99 |
| 2012/0315508 A1 | * | 12/2012 | Kurita ................ | H01M 2/1077 429/7 |

(Continued)

FOREIGN PATENT DOCUMENTS

| | | | |
|---|---|---|---|
| DE | 10 2011 120 247 A1 | | 6/2012 |
| WO | WO2012043594 | * | 4/2012 |
| WO | WO 2013/073046 A1 | | 5/2013 |

OTHER PUBLICATIONS

Extended European Search Report dated Nov. 20, 2014 for EP 14172642.2; Shi-Dong Park, et al.

(Continued)

*Primary Examiner* — Ula C Ruddock
*Assistant Examiner* — Matthew Van Oudenaren
(74) *Attorney, Agent, or Firm* — Lee & Morse, P.C.

(57) ABSTRACT

A battery module includes a plurality of battery cells arranged in a first direction, a pair of end plates adjacent to outermost battery cells of the plurality of battery cells, the pair of end plates extending along the plurality of battery cells in a second direction and being spaced apart along the first direction, and at least one bush member coupled to each of the end plates.

20 Claims, 10 Drawing Sheets

(56) References Cited

U.S. PATENT DOCUMENTS

2013/0149577 A1 6/2013 Lee et al.
2013/0183571 A1* 7/2013 Miyazaki ............ H01M 2/1077
429/156
2014/0295227 A1 10/2014 Aoki

OTHER PUBLICATIONS

European Examination Report dated May 19, 2016 in Corresponding European Patent Application No. 14172642.2.

* cited by examiner

BATTERY MODULE

CROSS-REFERENCE TO RELATED APPLICATION

The present application claims priority under 35 U.S.C. §119 to U.S. Provisional Application No. 61/839,965, filed on Jun. 27, 2013, and entitled: "Battery Module," which is incorporated herein by reference in its entirety.

BACKGROUND

1. Field

Embodiments relate to a battery module.

2. Description of the Related Art

Recently, a high-power battery module using a non-aqueous electrolyte with high energy density has been developed. The high-power battery module is configured as a large-capacity battery module manufactured by connecting a plurality of battery cells in series so as to be used for driving devices, e.g., motors of electric vehicles and the like, which require high power.

Typically, when the battery module is fixed to a base portion of an apparatus where the battery module is being mounted to, a hole for bolting is provided through expansion of an end plate adjacent to an outermost battery cell. However, the above method may induce an over design of a basic material of an end plate in order to secure hardness according to a weight of the battery module and an environment specification. In addition, a risk of concentration of stress due to a localized module fixed structure may increase.

SUMMARY

Embodiments are directed a battery module including a plurality of battery cells arranged in a first direction, a pair of end plates adjacent to outermost battery cells of the plurality of battery cells, the pair of end plates extending along the plurality of battery cells in a second direction and being spaced apart along the first direction, and at least one bush member coupled to each of the end plates.

The at least one bush member may extend along the second direction.

The bush member may protrude from the end plate towards a base portion and secures respective end plates to the base portion.

The bush member may include a hole and a fixing member inserted into each hole of respective bush members, each fixing member protruding from the hole along the second direction and securing the end plate to the base portion.

The fixing member may be a bolt.

The at least one bush member may include a pair of bush members coupled to respective end plates, the pair of bush members being separated along a third direction, orthogonal to the first and second directions.

The pair of bush members may be coupled to respective ends of the respective end plates.

Each end plate may include an extending portion extending from respective ends towards the outermost battery cell along the first direction, the bush members being coupled to the extending portion.

The bush member may include a guide portion that protrudes from the end plate extending along the second direction opposite the base portion and overlaps the end plate along the first direction and the extending portion along the third direction.

The bush member and the extending portion may be coupled by a laser weld.

The battery module may include an end block between the outermost battery cell and the end plate.

Each end block includes a mounting region for the at least one bush member.

Each end block may abut the end plate and a corresponding outermost battery cell.

The end plate may include a first mating region and the end block may include a second mating region that couples with the first mating region.

The first mating region may protrude from the end plate towards the outermost battery cell.

The end block may be made of a lighter material than that of the end plates.

The battery module may include side plates coupling the pair of end plates, the side plates extending along the plurality of battery cells in the first direction.

The bush member may protrude from the end plate towards abase portion and secures respective end plates to the base portion, wherein the bush member includes a hole and a fixing member inserted into each hole of respective bush members, each fixing member protruding from the hole along the second direction and securing the end plate to the base portion. The side plate may include an extending portion extending from an end of the side plate adjacent the base portion towards the plurality of the battery cells along a third direction, orthogonal to the first and second directions. The battery may include a fixing hole in the extending portion, the fixing member extending through the fixing hole to secure the side plate to the bush member.

The battery module may include a top plate covering a top of the plurality of battery cells.

The bush member may protrude from the end plate towards a base portion and secures respective end plates to the base portion, wherein the bush member includes a hole and a fixing member inserted into each hole of respective bush members, each fixing member protruding from the hole along the second direction and securing the end plate to the base portion. The top plate may include an extending portion over the hole of the bush member. The battery module may include a fixing hole in the extending portion, the fixing member extending through the fixing hole to secure the top plate to the bush member.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
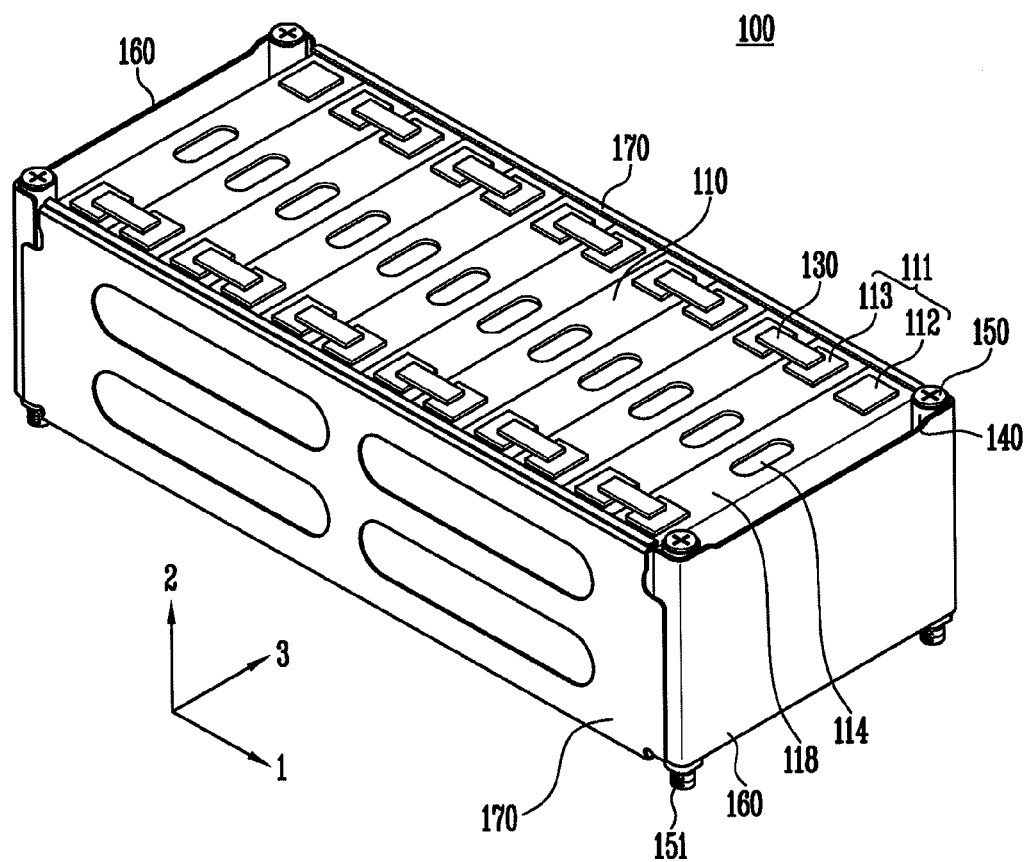
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 2:
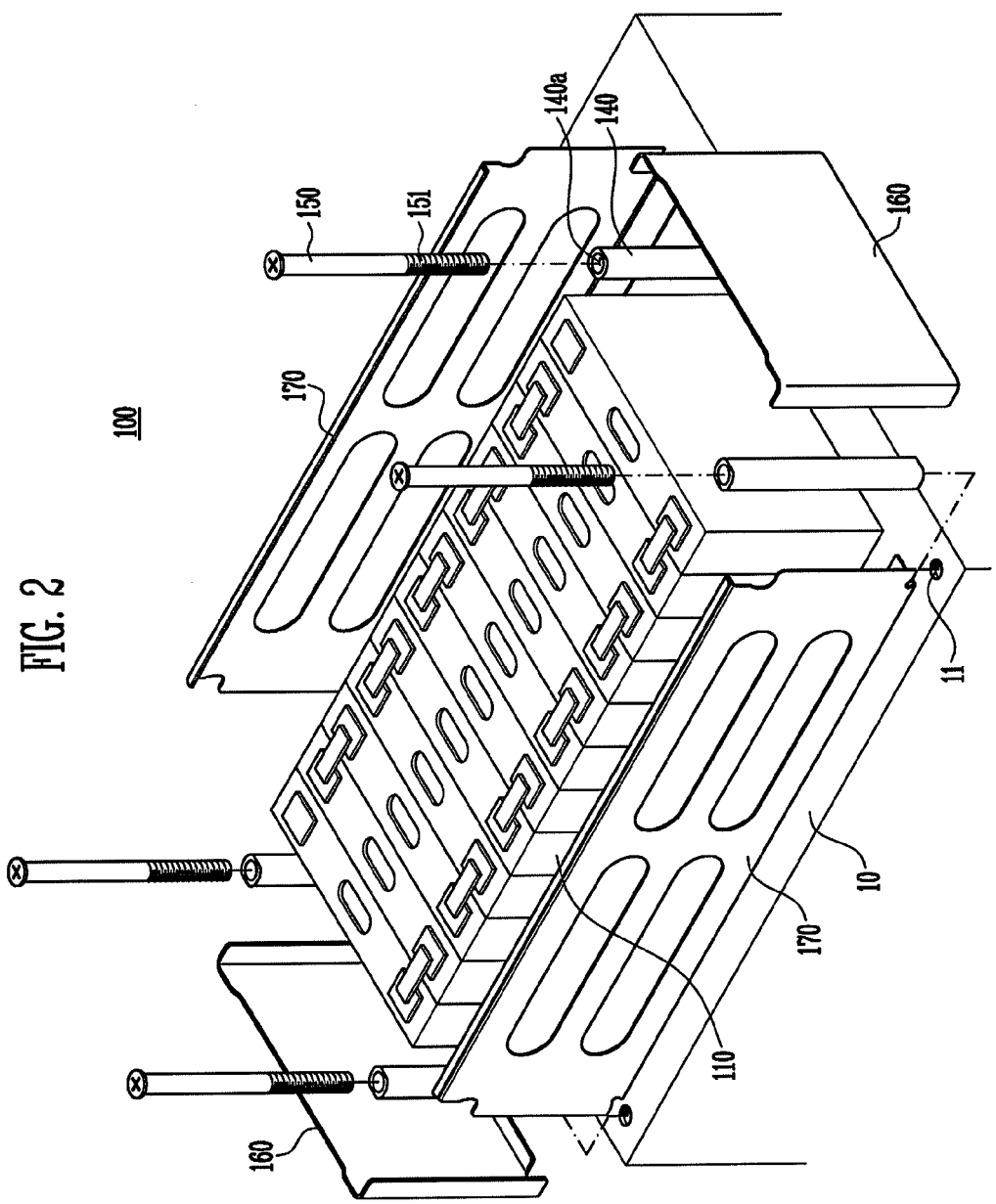
FIG. 2 illustrates an exploded perspective view of the battery module shown in FIG. 1.

FIG. 1 illustrates a perspective view of a battery module according to an embodiment. FIG. 2 illustrates an exploded perspective view of the battery module shown in FIG. 1.

In an embodiment, the battery module 100 may include a plurality of battery cells 110 arranged along a first direction. The battery cells 110 may be arranged such that wide surfaces of adjacent battery cells 110 face each other.

The battery cell 110 constituting the battery module 100 may include a battery case where one side is open and an electrode assembly and an electrolyte stored in the battery case. The electrode assembly and the electrolyte may generate energy in an electrochemical reaction. The battery case may be sealed by a first surface 118. The first surface 118 of the battery cell 110 may include a cap assembly. The first surface 118 may include a positive electrode terminal 112 and a negative electrode terminal 113, the positive and negative electrode terminals having different polarities, and a vent 114. The vent 114 serves as a passage through which gas generated inside the battery cell 110 is discharged to the outside as a safety precaution.

In this embodiment, a case where the battery cell 110 is a prismatic lithium ion secondary battery will be described as an example. However, embodiments may be applied to various types of batteries, e.g., a lithium polymer battery.

A pair of end plates 160 may be provided adjacent to the outermost battery cells 110. The pair of end plates 160 extend along a third direction. A pair of side plates 170 coupling the pair of end plates 160 may be provided on sides of the battery cells 110. The end plate 160 and the side plate 170 may be coupled to each other, e.g., using laser welding or ultrasonic wave welding. The plurality of battery cells 110 may be arranged in one direction in space sectioned by the pair of end plates 160 and the pair of side plates 170.

The plurality of battery cells 110 may be arranged side by side such that the wide surfaces face each other. The positive electrode terminal 112 and the negative electrode terminal 113 of two adjacent battery cells 110 may be electrically connected to each other through a bus-bar 130. The bus-bar 130 may be formed of electrically conductive metal, e.g., gold, silver, copper, nickel, aluminum, copper alloy, aluminum alloy, etc. to electrically connect the terminal portions 111. Furthermore, the bus-bar 130 may be coupled to the terminal portions 111, e.g., by welding. The welding may be laser welding or ultrasonic wave welding. The bus-bar 130 may take various forms based on a shape of the terminal portions 111.

A bush member 140 may be coupled to the end plate 160. The bush member 140 may have a first hole 140a inside the bush member 140. The battery module 100 may be fastened to a base portion 11 of an apparatus where the battery module 100 is mounted by a fixing member 150 inserted into the bush member 140.

Figure 3:
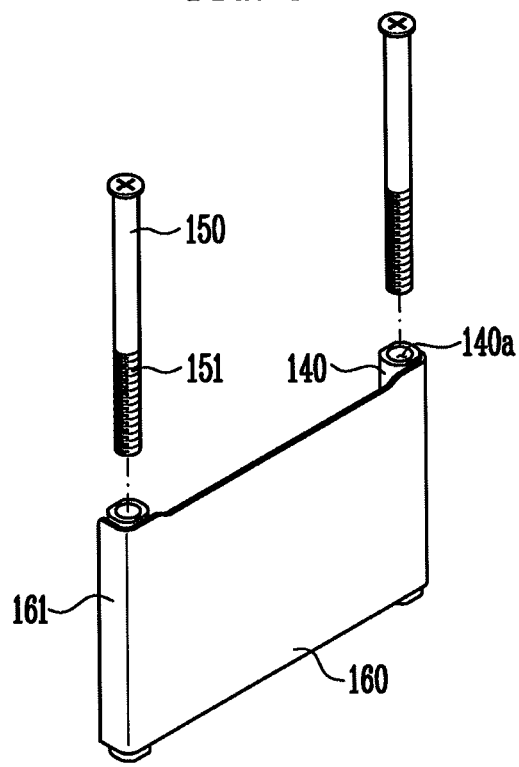
FIG. 3 illustrates a diagram of a coupling relationship between an end plate, a bush member and a fixing member according to an embodiment.

FIG. 3 illustrates a diagram of a coupling relationship between an end plate, a bush member, and a fixing member according to an embodiment. Referring to FIG. 3, the end plate 160 may include extending portions 161 that are bent and extended along a second direction at both ends, i.e., extending portions being separated along the first direction, of the end plate 160 towards of the battery cell 110. The bush member 140 may be coupled to the extending portion 161.

The end plate 160 and the bush member 140 may be formed of metal, e.g., steel. The bush member 140 may be robustly coupled to the extending portion 161, e.g., using laser welding or ultrasonic wave welding.

At the bush member 140, the first hole 140a that passes through along a direction of a length of the bush member 140 may be formed. The fixing member 150 may be inserted through the first hole 140a.

The fixing member 150 may be a long bolt. The battery module 100 may be fixed to the base portion 11 by having a screw line 151 formed in a lower part of the fixing member 150 be fastened to a hole formed at the base portion 11 of the apparatus.

In an embodiment, the battery module 100 is not fixed to the base portion 11 using a hole passing through the base portion 11 and bolting the battery module 100 to the base portion 11 through the hole by expanding the end plate; rather, the battery module 100 may be robustly fastened to the base portion 11 using a separate member such as the bush member 140.

Figure 4:
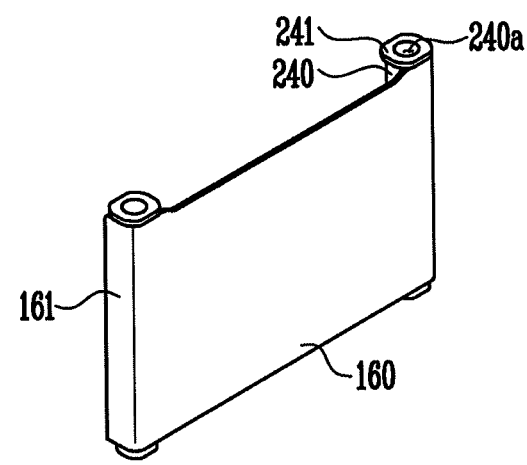
FIG. 4 illustrates a perspective view of an end plate and a bush member according to an embodiment.

FIG. 4 illustrates a perspective view of an end plate and a bush member according to an embodiment.

Referring to FIG. 4, a guide portion 241 configured to guide a location of the bush member 240 at the extending portion 161 of the end plate 160 may be formed on a top of the bush member 240. The bush member 240 may be guided such that the bush member 240 is positioned by the guide portion 241 to where the bush member 240 is desired to be as the bush member 240 is hooked at a top of the end plate 160. Accordingly, the bush member 240 may be easily welded to the end plate 160.

Figure 5:
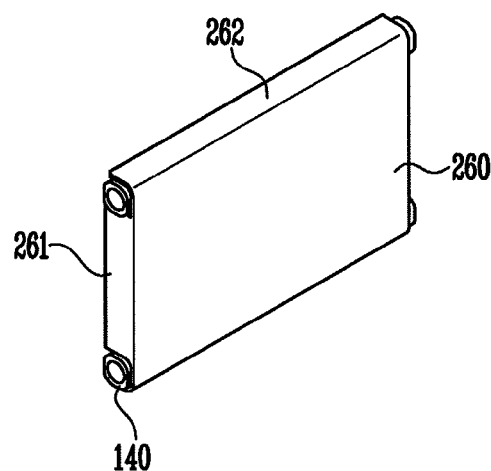
FIG. 5 illustrates a perspective view of an end plate and a bush member according to an embodiment.

FIG. 5 illustrates a perspective view of an end plate and a bush member according to an embodiment.

Referring to FIG. 5, the end plate 260 may include first extending portions 261 that are bent and extend along the second direction at both side ends of the end plate 260 towards the battery cell 110 and second extending portions 262 that are bent and extend along the third direction at upper and lower ends of the end plate 260 towards the battery cell 110. The bush member 140 may be coupled to the second extending portion 262.

Figure 6:
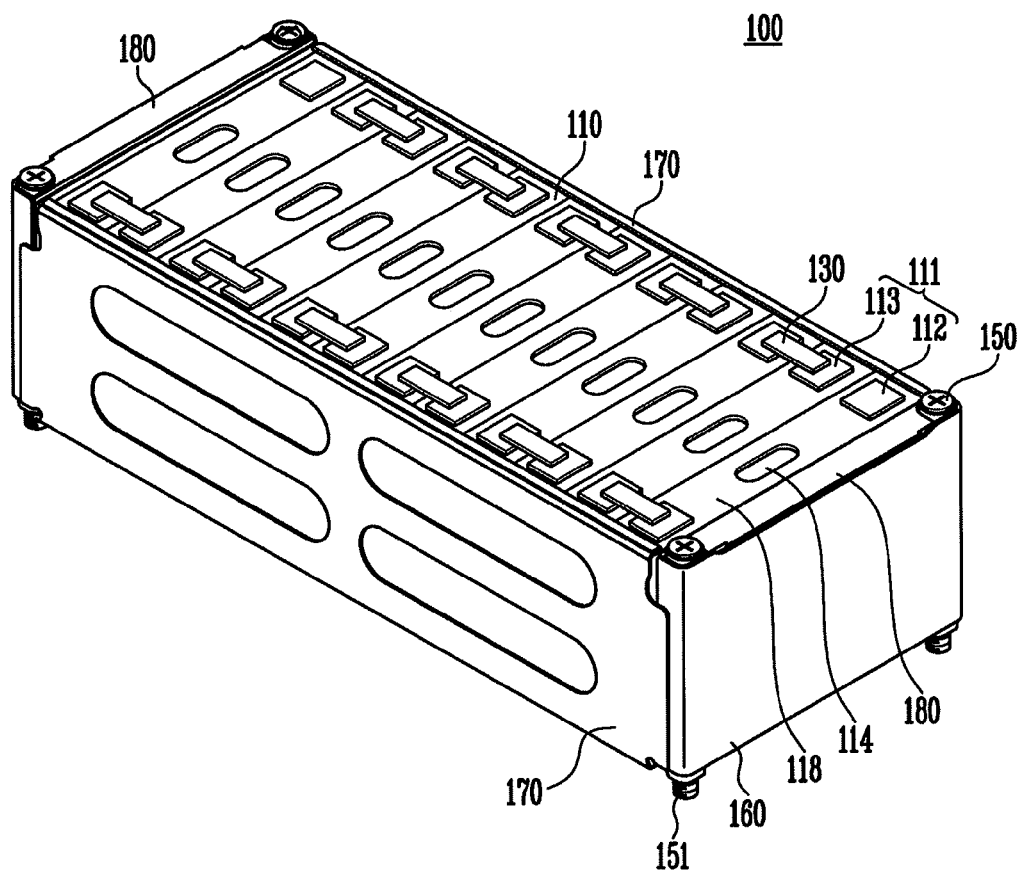
FIG. 6 illustrates a perspective view of a battery module according to an embodiment.
Figure 7:
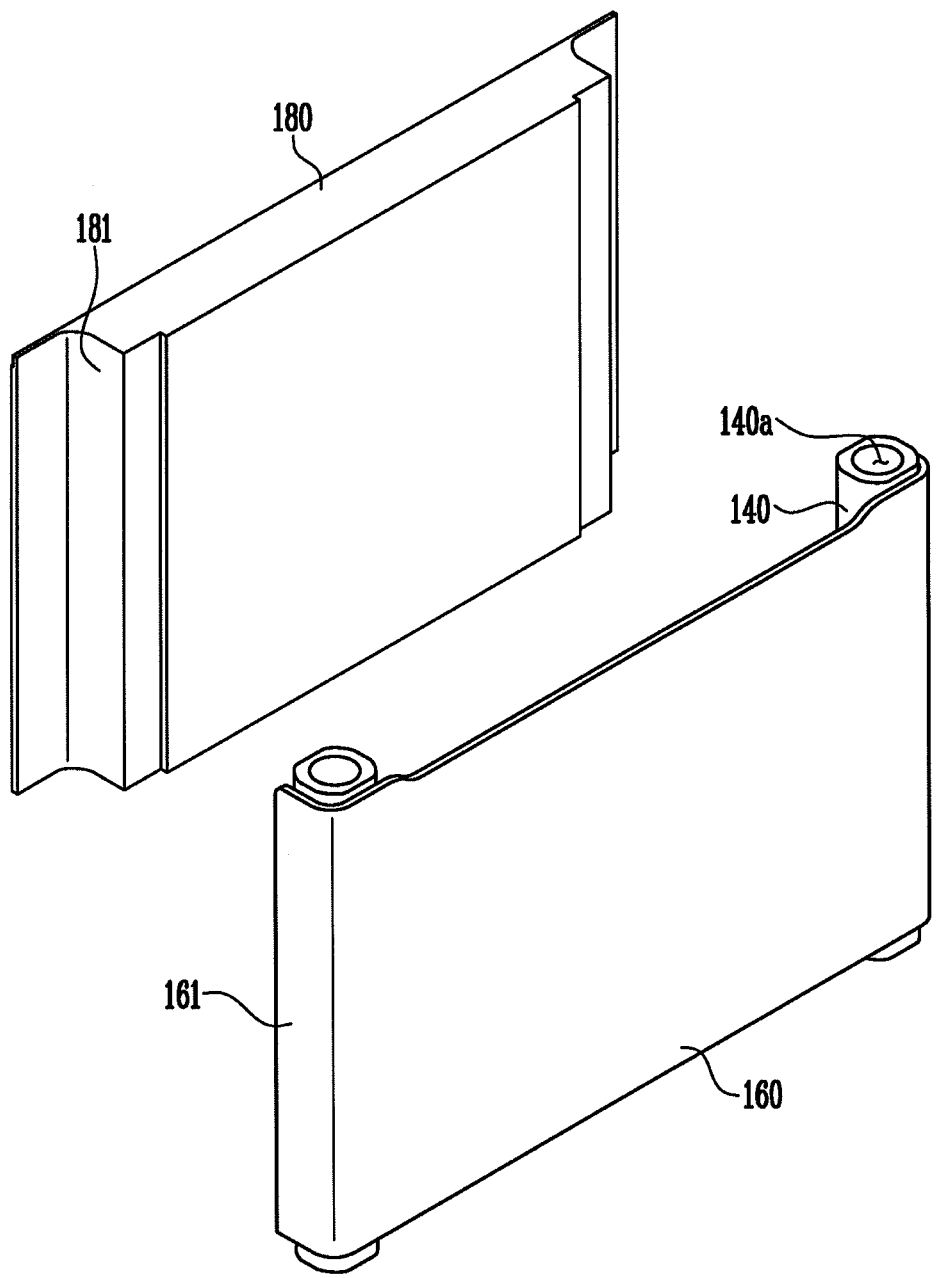
FIG. 7 illustrates a perspective view of the end block, end plate, and bush member in FIG. 6.

FIG. 6 illustrates a perspective view of a battery module according to an embodiment. FIG. 7 illustrates a perspective view of the end block, end plate, and bush member in FIG. 6. In this embodiment, referring to FIGS. 6 and 7, the end block, end plate, and bush member will be described. Like reference numerals refer to like elements throughout, and repetitive description will be omitted.

Referring to FIGS. 6 and 7, an end block 180 may be provided between the outermost battery cell 110 and the end plate 160. The end block 180 may fill space, made by the bush member 140, between the end plate 160 and the battery cell 110. Mounting regions 181 where the bush members 140 are mounted may be provided at both ends of the end block 180. The mounting region 181 may correspond to the bush member 140 in shape.

The end block 180 may be arranged to come in contact with the outermost battery cell 110 on the surface. The end block 180 may apply pressure to the plurality of battery cells 110 towards inside, which prevents a swelling phenomenon from occurring at the battery cells 110. In a case of a conventional battery module 110, pressure was applied to the battery cells 110 using only the end plates 160. In this case, the end plates 160 were thin, and therefore, there was a limit to how strong of pressure may be applied to the battery cells 110. However, in an embodiment, the end block 180 is further included, which increases the thickness of a portion applying pressure to the battery cells 110. Therefore, pressure may be more strongly applied to the battery cell 110.

The end block 180 may be formed of a lighter material such as a plastic material, unlike the end plate 160 which is formed of a metal material. Accordingly, the end block 180 may not significantly increase the weight of the battery module 100.

Figure 8:
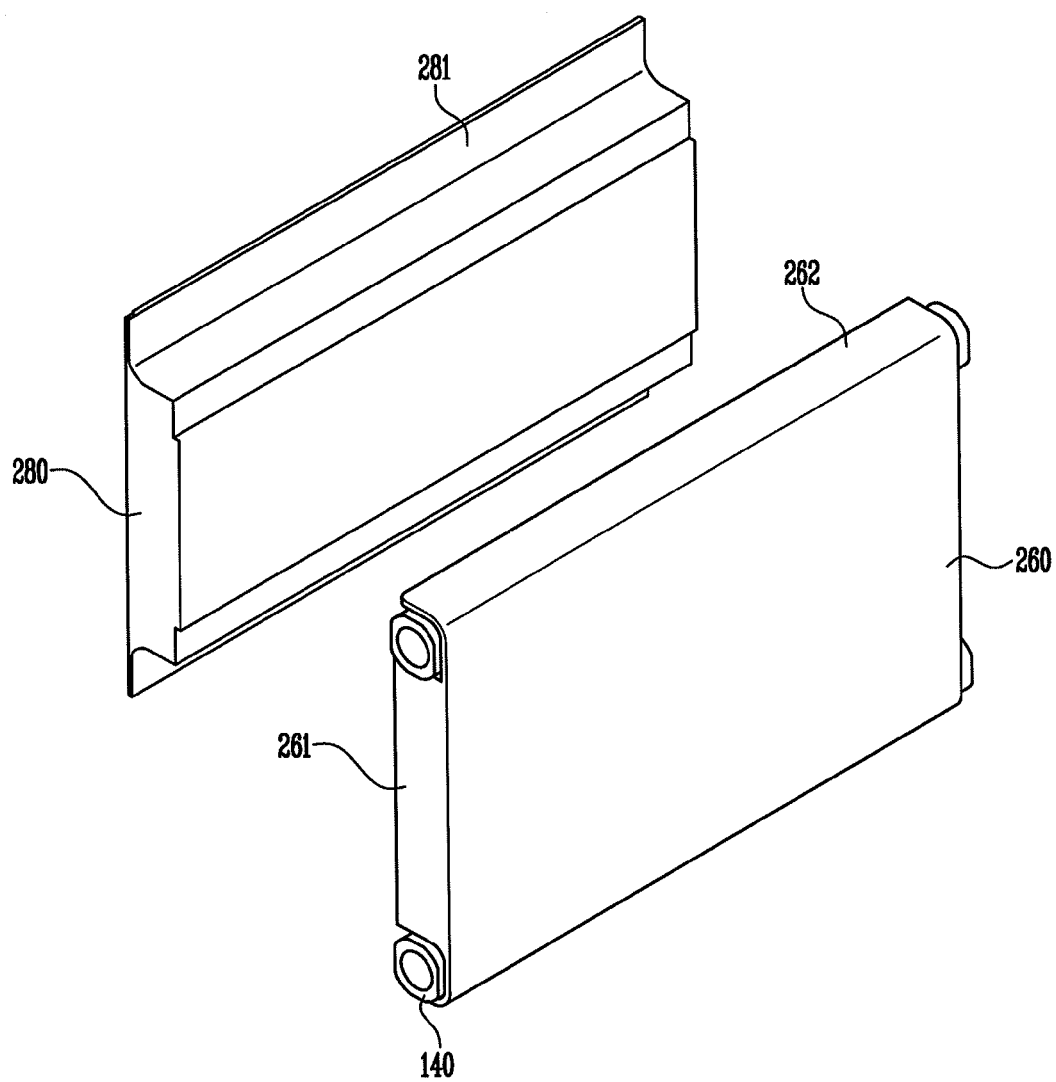
FIG. 8 illustrates a perspective view of the end block, end plate, and bush member according to an embodiment.

FIG. 8 illustrates a perspective view of the end block, end plate, and bush member according to an embodiment. In this embodiment, referring to FIG. 8, the end block, end plate and bush member will be described. Like reference numerals refer to like elements throughout, and repetitive description will be omitted.

Referring to FIG. 8, mounting regions 281 where the bush members 140 are mounted may be provided at upper and lower ends of the end block 280. The mounting region 281 may correspond to the bush member 140 in shape.

Figure 9:
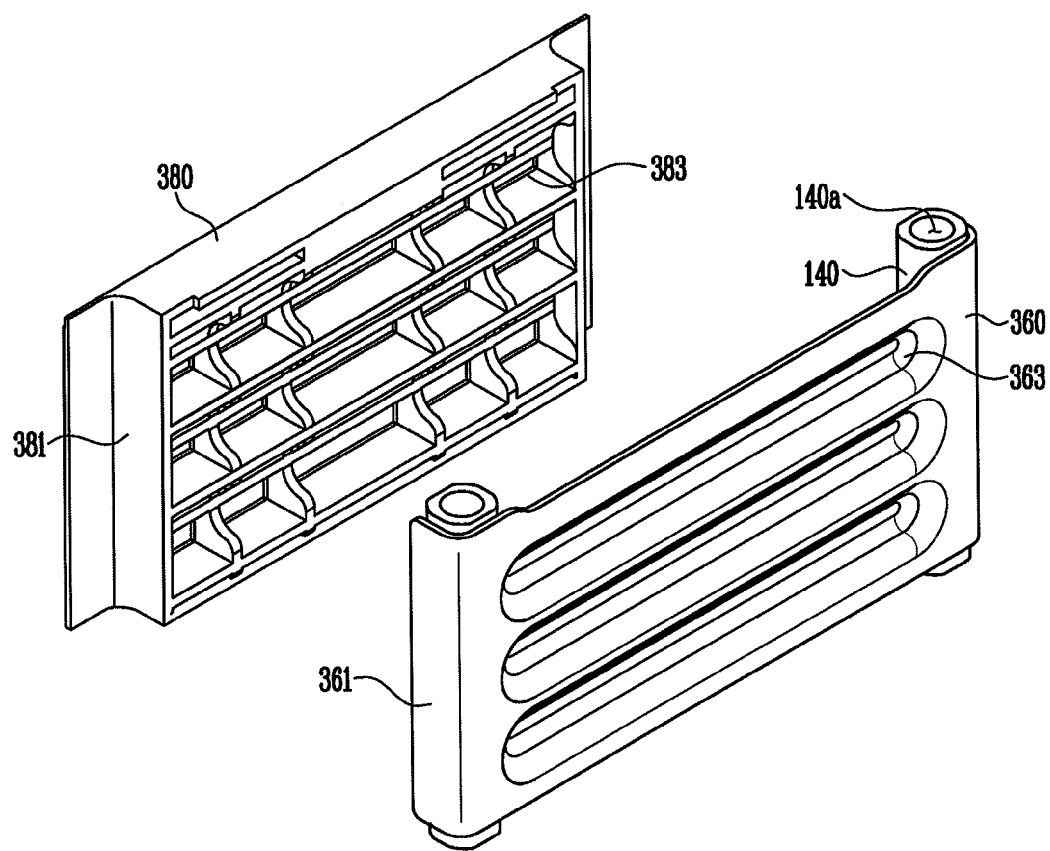
FIG. 9 illustrates a perspective view of an end block and an end plate according to an embodiment.

FIG. 9 illustrates a perspective view of an end block and an end plate according to an embodiment. In this embodiment, referring to FIG. 9, the end block and the end plate will be described. Like reference numerals refer to like elements throughout, and repetitive description will be omitted.

Referring to FIG. 9, at least a protruding region 363 maybe formed on a side of the end plate 360. The protruding region 363 may protrude in a direction of the end block 380. A receiving region 383 may be formed on a side of the end block 380. The receiving region 383 may receive the protruding region 363. As the protruding region 363 is received by the receiving region 383, the end block 380 and the end plate 360 may be tightly coupled together, and hardness may be increased against bending of the end plate 360.

Figure 10:
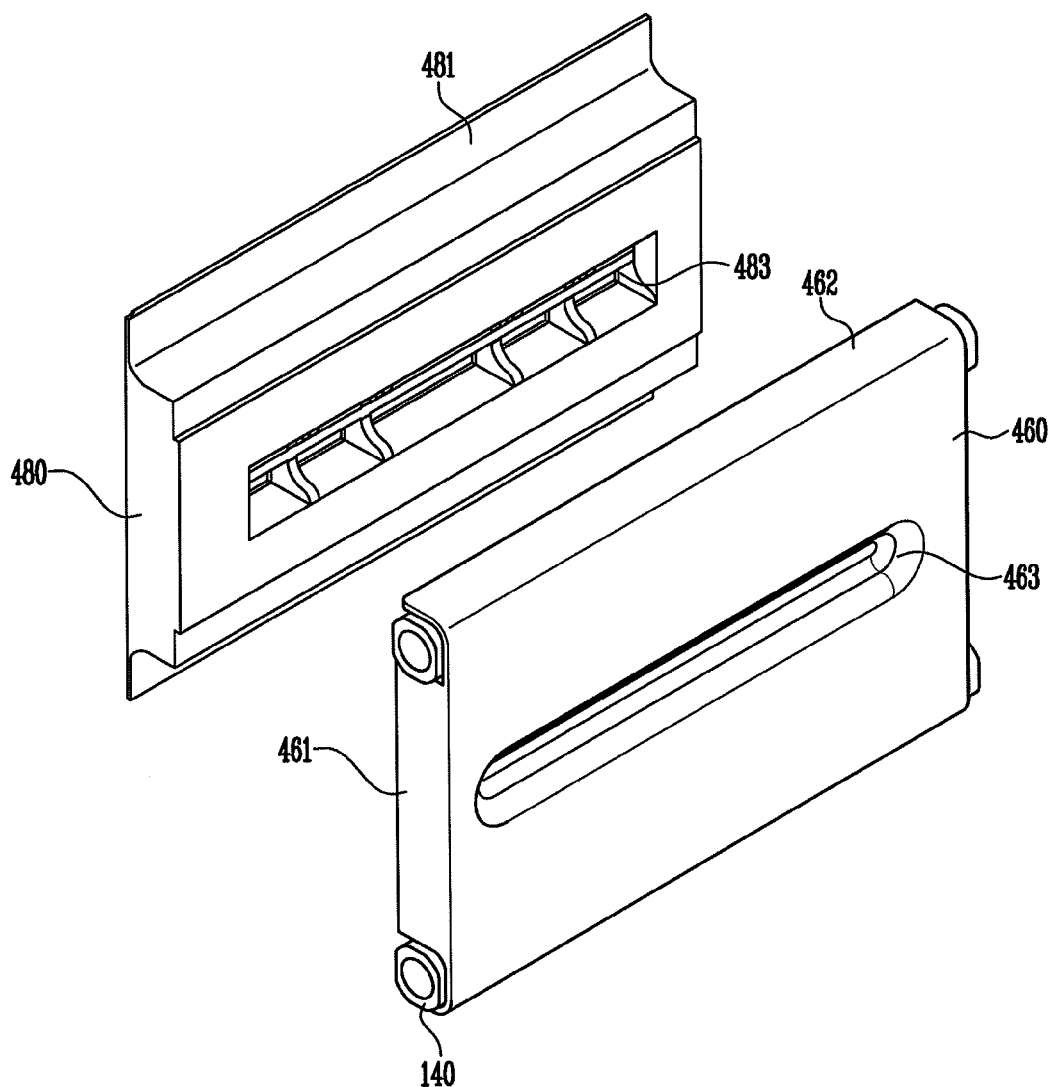
FIG. 10 illustrates a perspective view of an end block and an end plate according to an embodiment.

FIG. 10 illustrates a perspective view of an end block and an end plate according to an embodiment. In this embodiment, referring to FIG. 10, the end block and the end plate will be described. Like reference numerals refer to like elements throughout, and repetitive description will be omitted.

Referring to FIG. 10, at least a protruding region 463 may be formed on a side of the end plate 460. The protruding region 463 may protrude towards the end block 480. At least a receiving region 483 may be formed on a side of the end block 480. The receiving region 483 may receive the protruding region 463. As the protruding region 463 is received by the receiving region 483, the end block 480 and the end plate 460 may be tightly coupled together, and hardness may be increased against bending of the end plate 460.

The end plate 460 may include first extending portions 461 that are bent and extend along the second direction at both side ends of the end plate 460 towards the battery cell 110 and second extending portions 462 that are bent and extend along the third direction at upper and lower ends of the end plate 460 towards the battery cell 110. The bush member 140 may be coupled to the second extending portion 462.

Mounting regions 481 where the bush members 140 are mounted may be provided at upper and lower ends of the end block 480. The mounting region 481 may correspond to the bush member 140 in shape.

Figure 11:
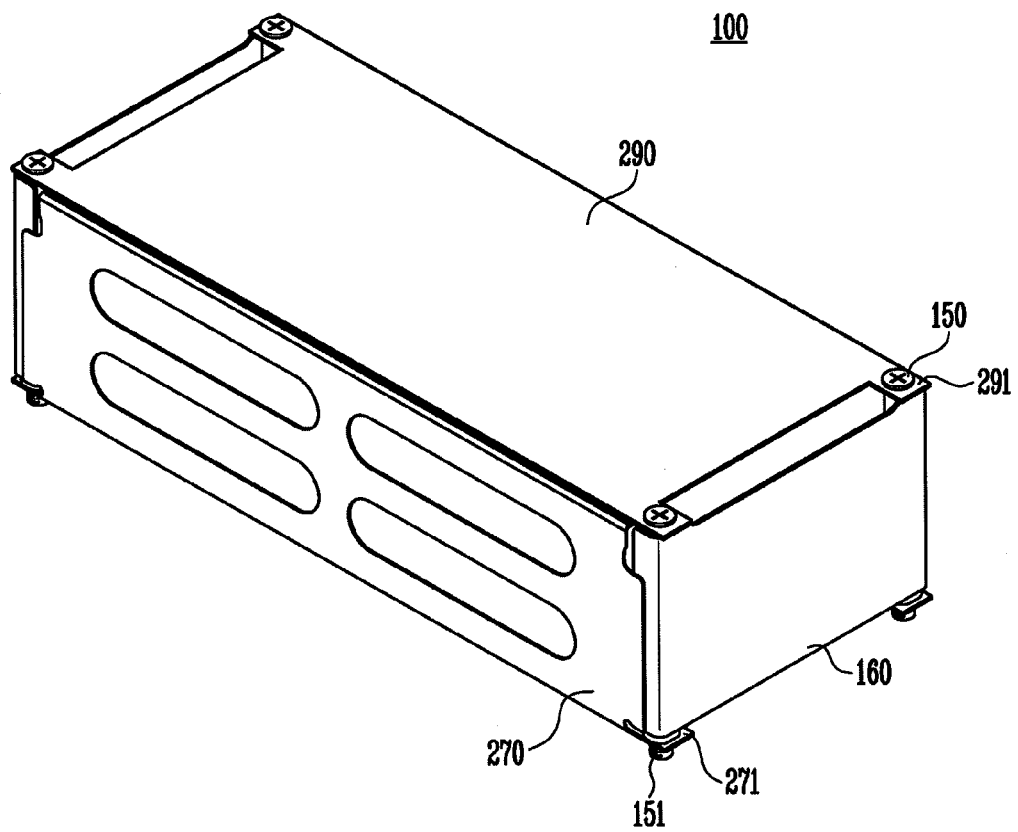
FIG. 11 illustrates a perspective view of a battery module according to an embodiment.
Figure 12:
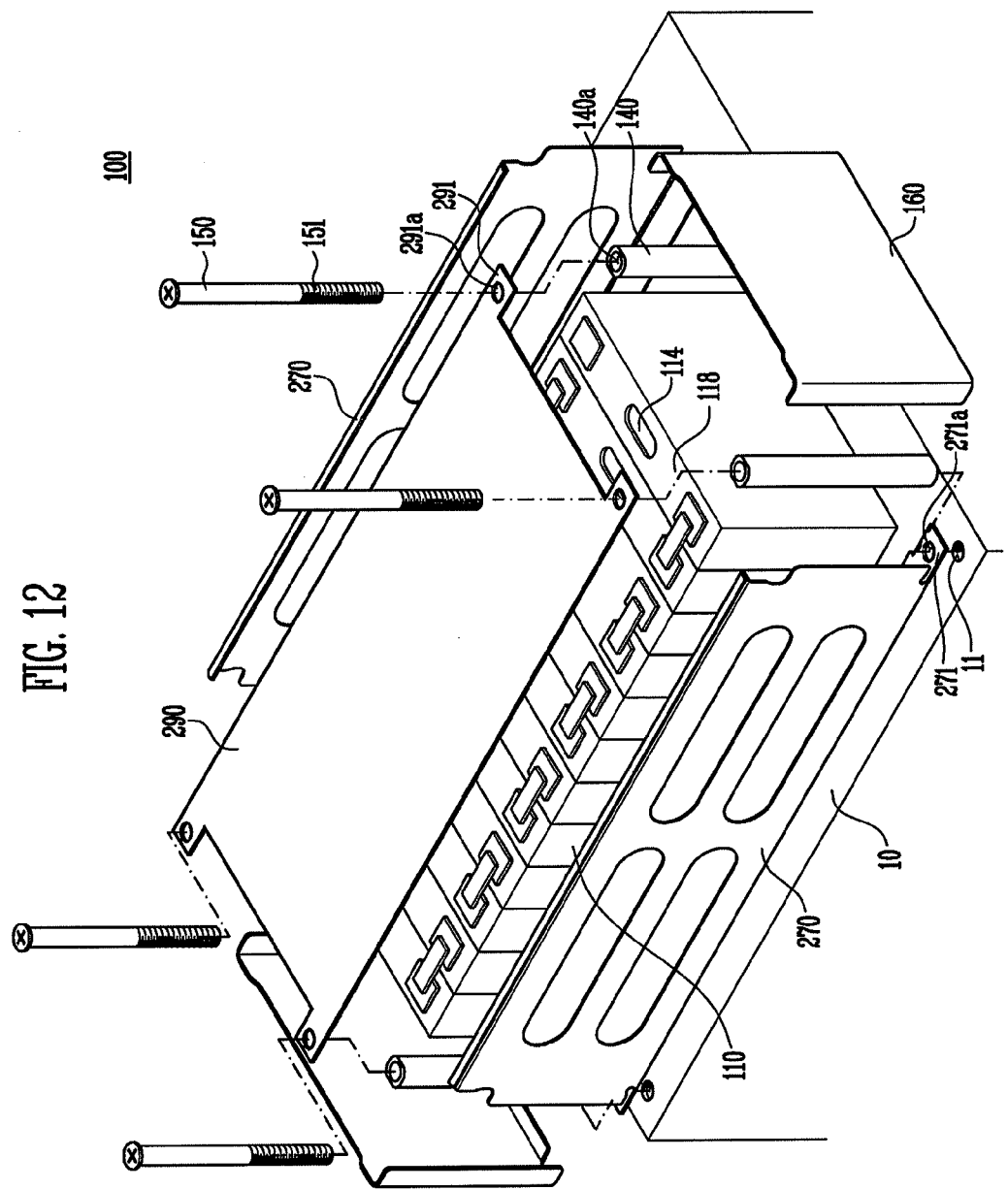
FIG. 12 illustrates an exploded perspective view of the battery module in FIG. 11.

FIG. 11 illustrates a perspective view of a battery module according to an embodiment. FIG. 12 illustrates an exploded perspective view of the battery module in FIG. 11. In this embodiment, referring to FIGS. 11 and 12, the end block and the end plate will be described. Like reference numerals refer to like elements throughout, and repetitive description will be omitted.

Referring to FIGS. 11 and 12, a side plate 270 may be arranged on a side of the battery cell 110. The side plate 270 may extend to a bottom of the bush member 140. The side plate 270 may include a first fixing hole portion 271 having a second hole 271a inside. The fixing member 150 may be inserted into the first and second holes 140a and 271a at the bush member 140, fastening the side plate 270 and the bush member 140 together. Therefore, the side plate 270 and the end plate 160 may be more robustly coupled.

The battery module 100 may include a top plate 290 covering a top of the battery cell 110. The top plate 290 may cover a first side 118 of the battery cell 110. The first side 118 may be a side of the battery cell 110 where the terminal portions 222 are pulled out. As the top plate 290 covers the first surface 118, short circuiting of the terminal portions 111 or the bus-bar 130 along with an outside conductive body may be prevented. The top plate 290 may be coupled to the side plate 270, e.g., using ultrasonic wave welding or laser welding.

A second fixing hole portion 291 having a third hole 291a inside may be provided at the top plate 290. The second fixing hole portion 291 may extend to the top of the bush member 140. The fixing member 150 may be inserted into the first and third holes 140a and 291a at the bush member 140, fastening the top plate 290 and the bush member 140 together. Therefore, the top plate 290 and the end plate 160 may be more robustly coupled.

By way of summation and review, according to one or more embodiments, the battery module may separately include the bush member in order to fix the battery module to the base portion. Thus, the battery module may be stably fixed. According to one or more embodiments, since the bush members are coupled to both ends or upper and lower ends of each of the pair of end plates, an impact coming from the outside that is applied to all across the battery module may be uniformly distributed to the end plates, which prevents the impact from being applied to certain portions only.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells arranged in a first direction;
   a pair of end plates adjacent to outermost battery cells of the plurality of battery cells, the pair of end plates being spaced apart along the first direction, each end plate including a plate portion extending along the plurality of battery cells in a second direction and extending portions that are bent from opposing edges of the plate portion, the extending portions extend along the first direction towards the battery cells, and are separated from one another; and
   at least one bush member coupled to each of the end plates and extending along an intersection of the plate portion and one of the extending portions, the at least one bush member being separable from a corresponding end plate.

2. The battery module as claimed in claim 1, wherein the at least one bush member extends along the second direction.

3. The battery module as claimed in claim 2, wherein the bush member protrudes from the end plate towards a base portion and secures respective end plates to the base portion.

4. The battery module as claimed in claim 3, wherein the bush member includes:
   a hole; and
   a fixing member inserted into each hole of respective bush members, each fixing member protruding from the hole along the second direction and securing the end plate to the base portion.

5. The battery module as claimed in claim 4, wherein the fixing member is a bolt.

6. The battery module as claimed in claim 3, wherein the at least one bush member includes a pair of bush members coupled to respective end plates, the pair of bush members being separated along a third direction, orthogonal to the first and second directions.

7. The battery module as claimed in claim 6, wherein the pair of bush members are coupled to respective ends of the respective end plates.

8. The battery module as claimed in claim 7, wherein each end plate includes an extending portion extending from respective ends towards the outermost battery cell along the first direction, the bush members being coupled to the extending portion.

9. The battery module as claimed in claim 8, wherein the bush member includes a guide portion that protrudes from the end plate extending along the second direction opposite the base portion and overlaps the end plate along the first direction and the extending portion along the third direction.

10. The battery module as claimed in claim 8, wherein the bush member and the extending portion are coupled by a laser weld.

11. The battery module as claimed in claim 1, further comprising an end block between the outermost battery cell and the end plate.

12. The battery module as claimed in claim 11, wherein the end block includes a mounting region for the at least one bush member.

13. The battery module as claimed in claim 11, wherein each end block abuts the end plate and a corresponding outermost battery cell.

14. The battery module as claimed in claim 11, wherein:
   the end plate includes a first mating region; and
   the end block includes a second mating region that couples with the first mating region.

15. The battery module as claimed in claim 14, wherein the first mating region protrudes from the end plate towards the outermost battery cell.

16. The battery module as claimed in claim 11, wherein the end block is made of a lighter material than that of the end plates.

17. The battery module as claimed in claim 1, further comprising:
   side plates coupling the pair of end plates, the side plates extending along the plurality of battery cells in the first direction.

18. The battery module as claimed in claim 17, wherein:
   the bush member protrudes from the end plate towards a base portion and secures respective end plates to the base portion, wherein the bush member includes:
   a hole; and
   a fixing member inserted into the hole of respective bush members, the fixing member protruding from the hole along the second direction and securing the end plate to the base portion; and
   each side plate includes:
   an extending portion extending from an end of the side plate adjacent the base portion towards the plurality of the battery cells along a third direction, orthogonal to the first and second directions; and
   a fixing hole in the extending portion,
   the fixing member extending through the fixing hole to secure the side plate to the bush member.

19. The battery module as claimed in claim 1, further comprising a top plate covering a top of the plurality of battery cells.

20. The battery module as claimed in claim 19, wherein the bush member protrudes from the end plate towards a base portion and secures respective end plates to the base portion, wherein the bush member includes:
   a hole; and
   a fixing member inserted into the hole of respective bush members, the fixing member protruding from the hole along the second direction and securing the end plate to the base portion; and
   the top plate includes:
   an extending portion over the hole of the bush member; and
   a fixing hole in the extending portion,
   the fixing member extending through the fixing hole to secure the top plate to the bush member.

* * * * *